(12) United States Patent
Fugiel et al.

(10) Patent No.: US 7,378,150 B2
(45) Date of Patent: May 27, 2008

(54) PROCESS FOR PREPARING POLYMERIC FILMS USEFUL FOR BLOCKING THE TRANSMISSION OF NEAR INFRA RED LIGHT

(75) Inventors: Richard A. Fugiel, Washington, WV (US); Richard Allen Hayes, Beaumont, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/713,299

(22) Filed: Mar. 2, 2007

(65) Prior Publication Data

US 2007/0148436 A1 Jun. 28, 2007

Related U.S. Application Data

(63) Continuation of application No. 11/013,499, filed on Dec. 15, 2004, now abandoned.

(60) Provisional application No. 60/529,853, filed on Dec. 15, 2003.

(51) Int. Cl.
*B32B 5/66* (2006.01)

(52) U.S. Cl. ............... 428/402; 428/407; 428/323; 428/328; 428/329; 428/426; 428/689; 428/702; 427/162; 427/163; 427/165; 427/168; 252/518

(58) Field of Classification Search ............... 428/323, 428/328, 329, 426, 685, 702, 402, 403, 407; 427/162, 163, 165, 168; 252/518
See application file for complete search history.

(56) References Cited

U.S. PATENT DOCUMENTS

| | | | |
|---|---|---|---|
| 5,275,869 A | 1/1994 | Lin | |
| 5,359,261 A | 10/1994 | Kondo et al. | |
| 5,482,614 A | 1/1996 | Kondo et al. | |
| 5,518,810 A * | 5/1996 | Nishihara et al. | 428/328 |
| 5,523,877 A | 6/1996 | Lynam | |
| 6,285,495 B1 | 9/2001 | Baranov et al. | |
| 6,315,848 B1 | 11/2001 | Kondo | |
| 6,319,613 B1 | 11/2001 | Takeda et al. | |
| 6,329,061 B2 | 12/2001 | Kondo | |
| 6,673,456 B1 | 1/2004 | Kobata et al. | |
| 2001/0016261 A1 | 8/2001 | Kondo | |
| 2002/0086926 A1 | 7/2002 | Fisher | |
| 2002/0150744 A1 | 10/2002 | Nagai | |
| 2002/0182422 A1 | 12/2002 | Garrett et al. | |
| 2003/0012964 A1 | 1/2003 | Choi et al. | |
| 2003/0020887 A1 | 1/2003 | Hasegawa | |
| 2003/0022001 A1 | 1/2003 | Durbin et al. | |
| 2003/0054160 A1 | 3/2003 | Fisher et al. | |
| 2003/0161997 A1 | 8/2003 | Moran | |
| 2004/0234778 A1 | 11/2004 | Fukatani et al. | |

FOREIGN PATENT DOCUMENTS

| | | |
|---|---|---|
| EP | 0 493 975 A1 | 7/1992 |
| EP | 1 188 551 A1 | 3/2002 |
| EP | 1 340 730 A1 | 9/2003 |
| JP | 1987052149 B2 | 7/1981 |
| JP | 1991295834 A | 12/1991 |
| JP | 1994024811 A | 2/1994 |
| JP | 1996231245 A | 9/1996 |
| JP | 2001019898 A | 1/2001 |
| JP | 2001302289 A | 10/2001 |
| WO | WO 01/25162 A1 | 4/2001 |
| WO | WO 01/96104 A2 | 12/2001 |
| WO | WO 02/070254 A1 | 9/2002 |
| WO | WO 02/077081 A1 | 10/2002 |
| WO | WO 03/016047 A2 | 2/2003 |
| WO | WO 03/018502 A1 | 3/2003 |

OTHER PUBLICATIONS

PCT International Search Report and Written Opinion for International application No. PCT/US2004/042477, dated Apr. 27, 2005.

* cited by examiner

*Primary Examiner*—Leszek Kiliman

(57) ABSTRACT

The present invention is an infra red (IR)-blocking coating and a process for applying the IR-blocking coating onto the surface of a polymer. The process comprises the steps of dispersing an IR-blocking material in a mixture of solvent comprising a dissolved polymer and using standard printing processes to coat at least a portion of the surface of a bulk polymer, preferably a sheet or film. The present invention also provides safety glass laminates whose polymer interlayers have improved adhesion to glass in addition to light blocking properties.

26 Claims, 1 Drawing Sheet

PROCESS FOR PREPARING POLYMERIC FILMS USEFUL FOR BLOCKING THE TRANSMISSION OF NEAR INFRA RED LIGHT

This application claims the benefit of U.S. Provisional Application No. 60/529,853, filed Dec. 15, 2003, and U.S. patent application Ser. No. 11/013,499, filed Dec. 15, 2004 (now abandoned), which are incorporated by reference herein.

BACKGROUND OF THE INVENTION

1. Field of the Invention

This invention relates to films useful for blocking infrared (IR) and/or near infra red (NIR) light. This invention particularly relates to polymers having IR and/or NIR-blocking coatings on at least a portion of their surface and to a process for preparing same.

2. Description of the Related Art

Several patents and publications are cited in this description in order to more fully describe the state of the art to which this invention pertains. The entire disclosure of each of these patents and publications is incorporated by reference herein.

There is growing interest in means of controlling solar heat gain in automobiles and buildings. Various coated glasses have been proposed to reduce solar heat gain through windows. These coatings, however, which are generally thin films of silver or other metallic compounds, also generally block out electromotive energy. This effect renders inoperative various modern necessities such as cell phones, global positioning satellite (GPS) units, and automatic toll takers on toll roads. It has been demonstrated, however, that electromotive energy can pass through treated windows when the blocking particles are well separated from one another.

Coatings comprising dispersed blocking particles and disposed on glass or other substrates are well known. See, for example, U.S. Pat. Nos. 5,518,810; 6,579,608; and 6,506,487. These particles can include UV absorbing compounds, visible colored pigments, NIR (heat) absorbing compounds, or any combination of these entities. However, the energy blocking coatings known in the art generally have poor adhesion to some polymeric surfaces, particularly polyvinyl butyral (PVB). Good adhesion between the polymer interlayer and both the energy blocking coating and the glass are necessary requirements for appropriate functionality in a laminated safety glass. Adhesion that is too low can lead to exfoliation of the safety glass laminates, while adhesion that is too high can lead to impact failures.

SUMMARY OF THE INVENTION

In one aspect, the present invention is a polymer having a surface that is at least partially covered with a coating comprising infra red blocking particles, wherein the polymer is in the form of a film or sheet.

In another aspect, the present invention is a composition, which is a dispersion comprising Indium Tin Oxide (ITO) and polyvinylbutyral in dimethyl formamide (DMF).

In another aspect, the present invention is a process for preparing a polymeric film or sheet having at least one surface that is at least partially covered with a coating comprising infra red blocking particles. The IR blocking coating is applied by a process comprising the steps of: (1) dispersing the IR blocking particles in a mixture of PVB and dimethyl formamide (DMF) to obtain an IR blocking ink; (2) printing the IR blocking ink onto at least a portion of the polymeric surface.

In still another aspect, the present invention is a process for preparing a polymeric film or sheet having at least one surface that is at least partially covered with a coating comprising infra red blocking particles, wherein the IR blocking coating comprises IR blocking particles dispersed in PVB, comprising the steps: passing a mixture of IR blocking particles, dimethyl formamide (DMF), and PVB through a grinding apparatus to disperse the IR blocking particles and obtain an IR blocking ink; and printing the ink onto the surface of the polymer film or sheet.

In another aspect, the present invention is a laminate comprising a polymeric film or sheet wherein the film or sheet comprises at least one surface that is at least partially covered with an IR blocking coating comprising IR blocking particles and PVB.

In still another aspect, the present invention is a laminate comprising at least two layers of a polymeric film or sheet, at least one of said two layers having at least one surface that is at least partially covered with an IR blocking coating comprising IR blocking particles and PVB.

DETAILED DESCRIPTION OF THE INVENTION

Figure 1:
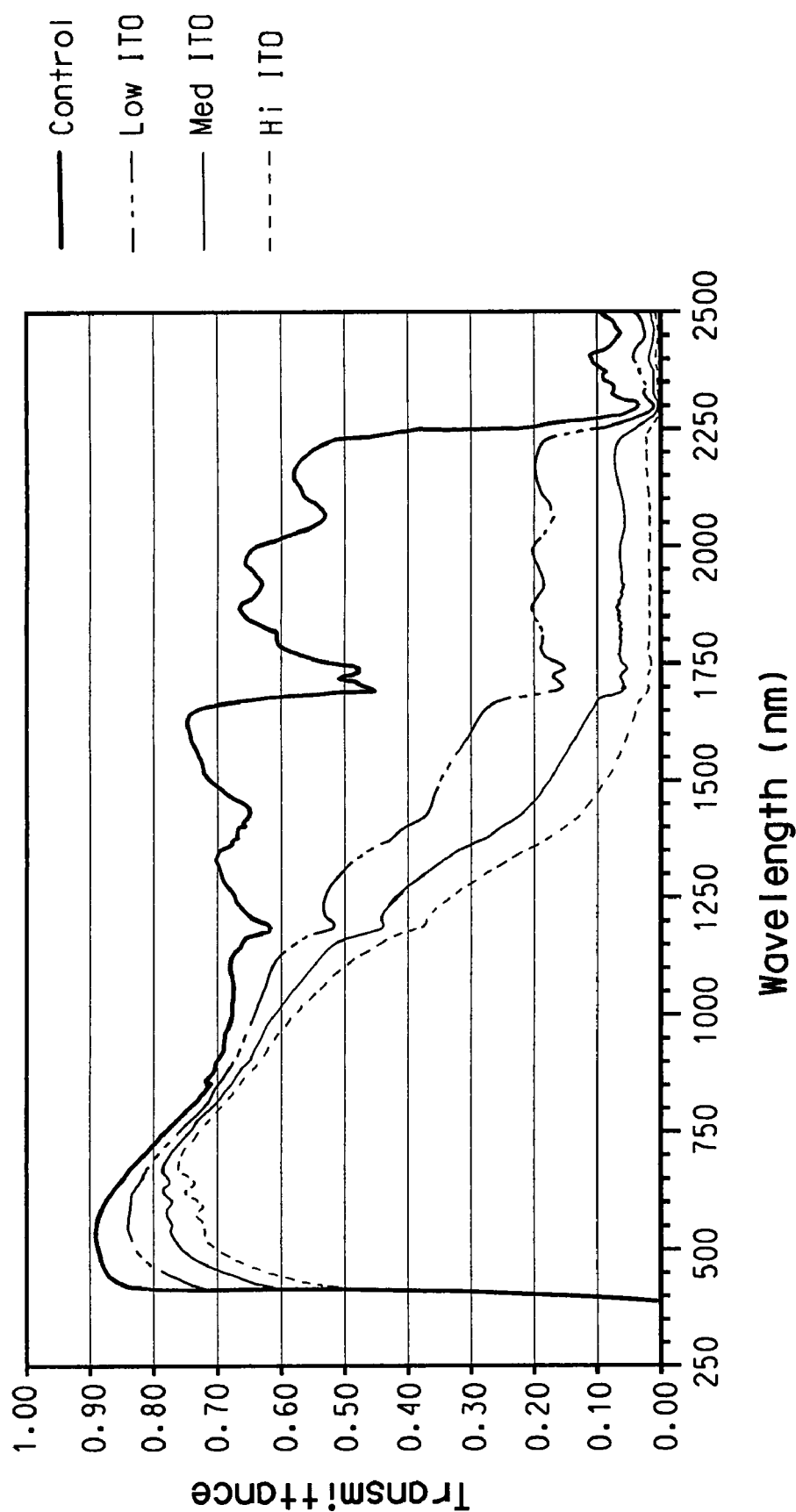
FIG. 1 is a graph of the light transmission spectra of a series of glass laminates having PVB sheets that are uncoated or coated with energy blocking coatings.

The definitions herein apply to the terms as used throughout this specification, unless otherwise limited in specific instances.

The term "solution", as used herein with respect to liquids containing one or more polymers, refers to liquids in which at least one solute is a polymer, although the soluble polymer and other substances, including other polymer(s), may also be present in the liquid in undissolved form.

The terms "dispersion" and "suspension", as used herein, are interchangeable and refer to a liquid comprising particulate matter. A dispersion may be stable, unstable, or partially stable with respect to precipitation, flocculation, syneresis, etc.

The terms "energy blocking" and "IR blocking", as used herein, refers to a property of decreasing the transmission of energy, or, specifically, infra red energy. The blocking may occur by any mechanism, e.g., absorption, reflectance, etc.

The term "infra red", as used herein, includes the near infra red.

The terms "finite amount" and "finite value" refer to an amount that is not equal to zero.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

In one embodiment, the present invention is a polymer which has disposed on at least a portion of its surface a coating of an infra red blocking material that has been previously dispersed in a polymeric matrix. A polymer suitable for use in the present invention is one that is also suitable for use in a laminate with glass, and is preferably useful in architectural or automotive glazings. For example, a suitable polymer is one that is transparent to light in the visible region of the light spectrum. More particularly, suitable polymers include, without limitation, polyesters; polyurethanes; polyvinyl chlorides; polyacetals; polyvinyl butyral (PVB); and acid copolymers and copolymer ionomers obtained from copolymerization of ethylene with an ethylenically unsaturated carboxylic acid and/or derivatives thereof. Preferably the polymer is polyvinyl butyral.

The polymer can be formed into a film or a sheet by conventional methods such as by various conventional extrusion methods, including, without limitation, a cast film extrusion process or a blown film extrusion process.

The polymer on at least one of its surfaces is at least partially covered with a coating comprising an infra red blocking material. The infra red blocking material can be any material that interferes with the transmission of infra red light, preferably particularly near infra red light. Such materials are known and can be considered conventional. Such materials include, for example, indium tin oxide (ITO), antimony tin oxide (ATO), lanthanum hexaboride, and iron oxides. Preferably the IR blocking material is particulate in form. Typically the particles have ultra fine particles sizes so that the transparency of the laminate is not adversely affected. Preferably the IR blocking particles of the present invention comprise ATO or ITO. Even more preferably, the IR blocking particles comprise ITO.

Those of skill in the art are able to ascertain an appropriate level of IR blocking particles in the IR blocking coating, based on, e.g., the desired level of transmittance balanced against physical properties such as the haze of the coating, or the adhesion of the coated surface to another surface in a laminate. Preferably, however, the IR blocking material is present in the coating in a finite amount up to about 30 wt %, more preferably from about 10 wt % to about 20 wt %, and still more preferably about 15 wt % based on the total weight of the dispersion, i.e., of the IR blocking material, the DMF and the polymer.

In the present invention, the IR blocking particles are applied to the surface of the polymer as a dispersion of the small particles in a matrix comprising an organic solvent, such as dimethyl formamide (DMF) for example, and a polymeric binder. Preferably, the polymeric binder is dissolved in the organic solvent. Preferably the polymeric binder is the same as or compatible with the polymer being coated. By "compatible with", it is meant that the polymeric binder adheres strongly to the surface of the polymer being coated. The polymeric binder functions to aid in adhesion of the particles to the polymer surface, and to improve adhesion of the coated polymer to an adjoining layer in a laminate.

Preferably the polymeric binder comprises PVB. More preferably, the polymeric binder consists essentially of PVB. Still more preferably, the polymeric binder consists essentially of PVB having about 23% free hydroxyl.

Those of skill in the art will be able to ascertain an appropriate level of polymeric binder based on the desired properties of the coating. Preferably, however, the polymeric binder is present in a finite amount up to about 20 wt %, more preferably at a level of about 3 to about 13 wt %, and still more preferably at a level of about 8 wt %, based on the total weight of the IR blocking particle dispersion. Of note are IR blocking coatings comprising about 8 wt % of a 23% free hydroxyl PVB.

In another embodiment, the present invention is a process for applying a dispersion of an IR blocking material to at least a portion of the surface of a polymeric material comprising the step of printing the dispersion onto the surface. Preferably the polymeric material is in the form of a film or sheet. Preferably the printing step is a conventional process such as flexographic or gravure printing. The process can comprise the step of passing the IR blocking particles through a grinding or milling apparatus, such as an Eiger mill, to reduce the particle size of the IR blocking material and/or to disperse the material in the organic solvent or in the polymer matrix. Accordingly, the IR blocking material can be passed through the grinding apparatus dry, or as a dispersion in the organic solvent, or as a dispersion in the polymer matrix. The dispersed ink thus obtained can be printed onto at least a portion of at least one surface of the polymer. Preferably the ink is printed directly onto a surface of the polymer. The coated polymer may optionally be dried by any suitable means known in the art, such as by the application of heat or vacuum of both, for example.

In another embodiment, the present invention is a laminate comprising at least one polymer layer that is at least partially covered with a coating comprising an IR blocking material. Suitable and preferred polymer layers and IR blocking coatings are as set forth above. The laminate preferably comprises at least one sheet of glass, but can comprise another material in a rigid transparent layer as a substitute for glass.

In another embodiment, the present invention comprises a laminate of at least two polymer layers, at least one of which has been at least partially covered with a coating comprising an IR blocking material. Again, suitable and preferred polymer layers and IR blocking coatings are as set forth above. The sheets can be laminated together as adjoining and adjacent layers, or can be separated by other laminate layers. The coated polymers can comprise the same materials or different materials, including the same or different IR blocking materials. In a preferred embodiment, the coating or coatings are disposed between two of the polymer layers. More preferably, the two polymer layers are adjacent. In another preferred embodiment, the laminate includes at least one outer layer of glass or another material in a rigid transparent layer as a substitute for glass. More preferably, the laminate includes two outer layers of glass or another rigid transparent material.

The coated surface of the polymer in a laminate of the present invention can be oriented away from the outer surface of the laminate, or towards the outer surface of the laminate, or can be the outer surface of the laminate. Various laminate constructions can be envisioned by one of ordinary skill in the glazing art.

EXAMPLES

The Examples and Comparative Examples are presented for illustrative purposes only, and are not intended to limit the scope of the present invention in any manner.

Example 1

Indium tin oxide (40 gms) is dispersed in 300 gms of a 6.4% PVB in DMF solution. The dispersion is milled in an Eiger mill at ambient temperature for approximately 4 hours, or until the mixture appears uniform in appearance. The dispersion is then coated by hand-dipping onto a sheet of 3GO-based PVB (30 mils) using a rotogravure printing process. The web speed was 50 fpm. The PVB sheet was imprinted with up to four layers of the the ITO dispersion. Samples were cut from the printed PVB sheet after each of the printing passes.

The samples of the coated PVB sheet were laminated between two layers of clear glass, thickness 2.3 mm. The glass laminates are tested by measuring haze, pummeling, and the transmittance of light having wavelengths in the range of from 275 to 2500 nm.

The light transmittance results of a similar experiment, which are shown in FIG. 1, clearly demonstrate that the transmittance of light at longer wavelengths, including NIR wavelengths, decreases significantly upon application of a coating of the invention. Moreover, the transmittance decreases even further with increasing levels of ITO.

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. A process of preparing a laminate comprising (a) at least one layer of glass or another rigid transparent layer and (b) at least one polymeric film or sheet comprising at least one surface that is at least partially covered with an infra red blocking coating comprising infra red blocking materials, the process comprising: (a) providing the at least one layer of glass or another rigid transparent layer; (b) providing at least one polymeric film or sheet; (c) applying the at least one surface of the at least one polymeric film or sheet with the infra red blocking coating comprising infra red blocking material by printing; and (d) forming the laminate.

2. A laminate prepared by the process of claim 1 comprising (a) at least one layer of glass or another rigid transparent layer and (b) at least one polymeric film or sheet comprising at least one surface that is at least partially covered with an infra red blocking coating comprising infra red blocking materials, wherein the polymeric film or sheet comprises a polymer selected from the group consisting of poly(vinyl butyral), and acid copolymers and copolymer ionomers obtained from copolymerization of ethylene with an ethylenically unsaturated carboxylic acid and/or derivatives thereof.

3. The laminate of claim 2 wherein the laminate comprises the at least one polymeric film or sheet laminated between two layers of clear glass.

4. The laminate of claim 3 wherein the at least one polymeric film or sheet is one polymeric film or sheet.

5. The laminate of claim 2, wherein the infra red blocking material is in the form of particles and comprise a material selected from the group consisting of indium tin oxide, antimony tin oxide, lanthanum hexaboride, and iron oxides.

6. The laminate of claim 3, wherein the infra red blocking material is in the form of particles and comprise a material selected from the group consisting of indium tin oxide, antimony tin oxide, lanthanum hexaboride, and iron oxides.

7. The laminate of claim 2 wherein the at least one polymeric film or sheet is the poly(vinyl butyral) film or sheet.

8. The laminate of claim 7 wherein the laminate comprises the at least one polymeric film or sheet laminated between two layers of clear glass.

9. The laminate of claim 8, wherein the infra red blocking material is in the form of particles and comprise a material selected from the group consisting of indium tin oxide, antimony tin oxide, lanthanum hexaboride, and iron oxides.

10. The laminate of claim 2 wherein the polymeric film or sheet comprises the polymer selected from the group consisting of acid copolymers and copolymer ionomers obtained from copolymerization of ethylene with an ethylenically unsaturated carboxylic acid and/or derivatives thereof.

11. The laminate of claim 2, wherein the printing comprises applying an ink comprising the infra red blocking coating, the ink comprises a dispersion of an infra red blocking material in the form of particles in a matrix comprising an organic solvent and a polymeric binder, the polymeric binder is dissolved in the organic solvent, and the infra red blocking material is selected from the group consisting of indium tin oxide, antimony tin oxide, lanthanum hexaboride and iron oxides particles.

12. The laminate of claim 11 wherein the at least one polymeric film or sheet is a poly(vinyl butyral) film or sheet and the polymeric binder is poly(vinyl butyral).

13. A safety glass laminate prepared by the process of claim 1 consisting essentially of a polymeric film or sheet (a) which comprises a surface that is at least partially covered with an infra red blocking coating comprising infra red blocking particles and (b) which is laminated between two layers of glass, wherein the polymeric film or sheet comprises a polymer selected from the group consisting of poly(vinyl butyral), and acid copolymers and copolymer ionomers obtained from copolymerization of ethylene with an ethylenically unsaturated carboxylic acid and/or derivatives thereof.

14. The laminate of claim 13 wherein the infra red blocking particles comprise a material selected from the group consisting of indium tin oxide, antimony tin oxide, lanthanum hexaboride, and iron oxides.

15. The process of claim 1, wherein the printing comprises applying an ink comprising the infra red blocking coating and wherein the infra red blocking material is in the form of particles and comprise a material selected from the group consisting of indium tin oxide, antimony tin oxide, lanthanum hexaboride, and iron oxides.

16. The process of claim 15 wherein the ink comprises a dispersion of the infra red blocking material in the form of particles in a matrix comprising an organic solvent and a polymeric binder, wherein the polymeric binder is dissolved in the organic solvent.

17. The process of claim 16 wherein the polymeric binder is the same as or compatible with the polymer of the polymer film or sheet being coated.

18. The process of claim 16 wherein the polymeric binder is the same as or compatible with the polymer of the polymer film or sheet being coated and the polymeric binder adheres to the surface of the polymer.

19. The process of claim 16 wherein the at least one polymeric film or sheet is a poly(vinyl butyral) film or sheet and the polymeric binder is poly(vinyl butyral).

20. The process of claim 19 wherein the solvent is dimethyl formamide.

21. The process of claim 1 wherein the at least one polymeric film or sheet is a poly(vinyl butyral) film or sheet.

22. The process of claim 1 wherein the polymeric film or sheet comprises a polymer selected from the group consisting of acid copolymers and copolymer ionomers obtained from copolymerization of ethylene with an ethylenically unsaturated carboxylic acid and/or derivatives thereof.

23. The process of claim 15, wherein the infra red blocking particles are dispersed in poly(vinyl butyral), and the infra red coating is prepared by a process comprising the steps: passing a mixture of the infra red blocking particles, dimethyl formamide, and the poly(vinyl butyral) through a grinding apparatus to disperse the infra red blocking particles and obtain the ink; and the printing comprises printing the ink onto the surface of the polymer film or sheet.

24. The process of claim 16, wherein the printing is selected from the group consisting of flexographic or gravure printing.

25. A process of preparing a laminate comprising (a) at least one layer of glass or another rigid transparent layer and (b) at least one polymeric film or sheet, the process comprising: (a) providing the at least one layer of glass or another rigid transparent layer; (b) providing at least one polymeric film or sheet comprising at least one surface that is at least partially covered with an infra red blocking coating comprising infra red blocking materials; and (c) forming the laminate, wherein the polymeric film or sheet comprises a polymer selected from the group consisting of poly(vinyl butyral), and acid copolymers and copolymer ionomers obtained from copolymerization of ethylene with an ethylenically unsaturated carboxylic acid and/or derivatives thereof.

26. The process of claim 25 wherein (i) the at least one polymeric film or sheet is a poly(vinyl butyral) film or sheet, (ii) the polymeric binder is poly(vinyl butyral), (iii), the solvent is dimethyl formamide, and the printing is selected from the group consisting of flexographic or gravure printing.

* * * * *